United States Patent
Lee et al.

(10) Patent No.: US 10,416,457 B2
(45) Date of Patent: Sep. 17, 2019

(54) WATERPROOFED WEARABLE DISPLAYING DEVICE

(71) Applicant: HON HAI PRECISION INDUSTRY CO., LTD., New Taipei (TW)

(72) Inventors: Hsueh-Wen Lee, Tu-Cheng (TW); Chun-Yen Kuo, Tu-Cheng (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/802,461

(22) Filed: Nov. 3, 2017

(65) Prior Publication Data

US 2018/0348519 A1 Dec. 6, 2018

(30) Foreign Application Priority Data

Jun. 2, 2017 (TW) .............................. 106118361 A

(51) Int. Cl.
*G02B 27/01* (2006.01)
*G06F 3/01* (2006.01)
*A63B 33/00* (2006.01)
*G06T 19/00* (2011.01)

(52) U.S. Cl.
CPC ........ *G02B 27/0172* (2013.01); *A63B 33/002* (2013.01); *G02B 27/0176* (2013.01); *G06F 3/012* (2013.01); *G06T 19/006* (2013.01); *A63B 2033/004* (2013.01); *G02B 2027/0178* (2013.01)

(58) Field of Classification Search
CPC ... G02B 27/0172; G06F 3/012; G06T 19/006; A63B 33/002

USPC .................. 345/8, 631; 359/630; 351/159.01
See application file for complete search history.

(56) References Cited

U.S. PATENT DOCUMENTS

| | | | | |
|---|---|---|---|---|
| 10,029,621 | B2 * | 7/2018 | Vojtisek | .................... B60R 1/00 |
| 2005/0225867 | A1 * | 10/2005 | Ishibashi | ................... A61F 9/02 |
| | | | | 359/630 |
| 2008/0316605 | A1 * | 12/2008 | Hazell | .................. G02B 6/0033 |
| | | | | 359/630 |
| 2010/0229291 | A1 * | 9/2010 | Tominaga | ............... A61F 9/025 |
| | | | | 2/431 |
| 2012/0238380 | A9 * | 9/2012 | Marty | ................ A63B 24/0003 |
| | | | | 473/407 |
| 2014/0063054 | A1 * | 3/2014 | Osterhout | ............... G06F 3/005 |
| | | | | 345/633 |
| 2014/0237709 | A1 * | 8/2014 | McCulloch | ............. A61F 9/025 |
| | | | | 2/435 |

(Continued)

FOREIGN PATENT DOCUMENTS

CN 205127317 * 4/2016 ............. A63B 33/00
CN 106526865 A 3/2017

*Primary Examiner* — Prabodh M Dharia
(74) *Attorney, Agent, or Firm* — ScienBiziP, P.C.

(57) ABSTRACT

A waterproofed wearable displaying device with an augmented reality function. The wearable displaying device is in form of goggles. A waterproofer is attached in front of a lens of the goggle. A receiving space defined between the waterproofer and the lens is sealed. The wearable displaying device further includes an image capturing device and a display in the receiving space. When the user wears the wearable displaying device indoors or outdoors, the display faces to the user's eyes, and modules in the device can detect air pressure and humidity in the goggles, to maintain air pressure within the goggles at a slight vacuum compared to the air pressure outside.

20 Claims, 20 Drawing Sheets

(56) References Cited

U.S. PATENT DOCUMENTS

| | | | |
|---|---|---|---|
| 2015/0245134 A1* | 8/2015 | Liu | H04R 1/44 |
| | | | 381/334 |
| 2015/0257811 A1* | 9/2015 | Schwartz | A61N 5/1027 |
| | | | 606/20 |
| 2016/0042475 A1* | 2/2016 | Tapia | G06Q 50/01 |
| | | | 386/224 |
| 2016/0062454 A1* | 3/2016 | Wang | G09G 5/003 |
| | | | 345/633 |
| 2016/0154241 A1* | 6/2016 | Alhashim | G02B 27/0172 |
| | | | 345/8 |
| 2016/0187654 A1* | 6/2016 | Border | G02B 5/04 |
| | | | 359/567 |
| 2016/0253842 A1* | 9/2016 | Shapira | G02B 27/017 |
| | | | 345/633 |
| 2017/0046979 A1* | 2/2017 | Lehary | H04B 1/3888 |
| 2017/0177759 A1* | 6/2017 | Kim | G06F 17/5018 |
| 2017/0370864 A1* | 12/2017 | Samarao | G01N 27/121 |
| 2018/0000648 A1* | 1/2018 | McCulloch | A61F 9/025 |
| 2018/0069817 A1* | 3/2018 | Constantinides | H04L 51/20 |

\* cited by examiner

US 10,416,457 B2

WATERPROOFED WEARABLE DISPLAYING DEVICE

CROSS-REFERENCE TO RELATED APPLICATIONS

This application claims priority to Taiwan Application No. 106118361, filed on Jun. 2, 2017, the contents of which are incorporated by reference herein.

FIELD

The subject matter herein generally relates to a wearable displaying device.

BACKGROUND

Prior art augmented reality devices are shown in FIG. 1 and FIG. 2. FIG. 1 illustrates that a shell of the augmented reality device is a box. A mobile phone is placed in the box to use functions of the augmented reality device. FIG. 2 illustrates the augmented reality device when worn. But the shell of the augmented reality device in FIG. 1 and FIG. 2 is not sealed. When the augmented reality device is outside in the rain, the augmented reality device can be damaged.

BRIEF DESCRIPTION OF THE DRAWINGS

Implementations of the present technology will now be described, by way of example only, with reference to the attached figures.

DETAILED DESCRIPTION

Figure 1:
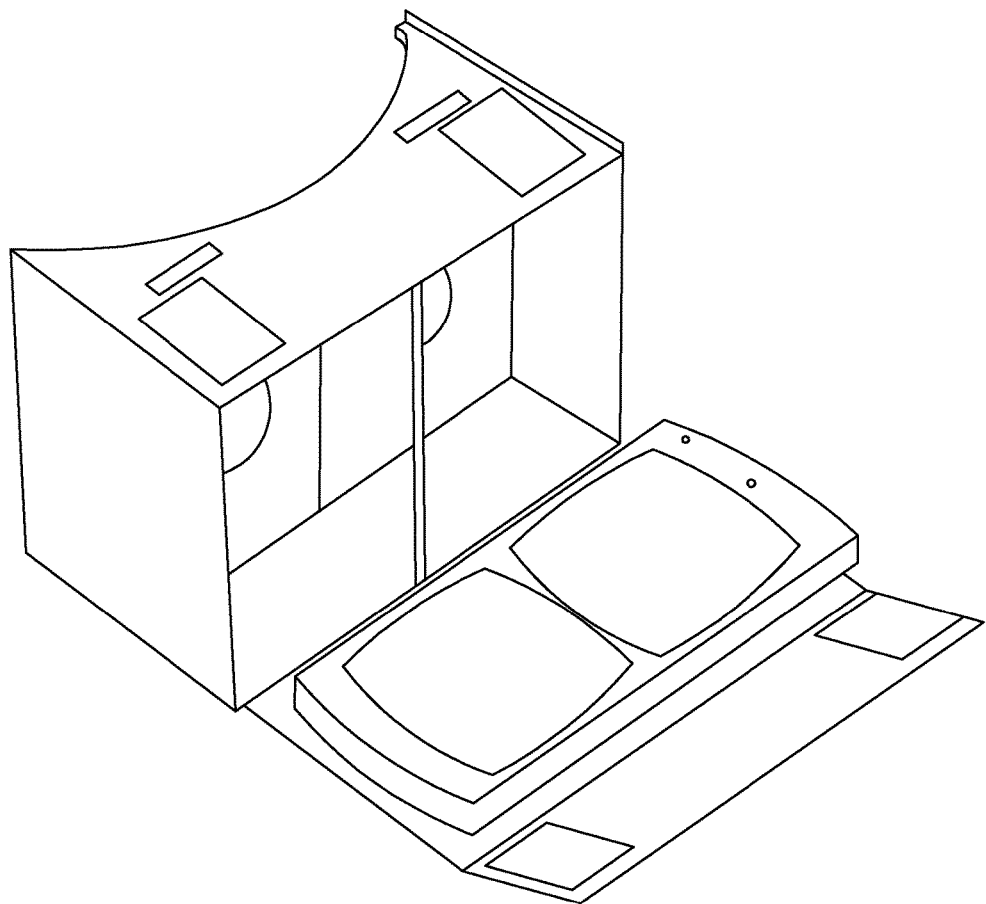
FIG. 1 is a schematic diagram of a wearable displaying device in prior art.
Figure 2:
FIG. 2 is a schematic diagram of another wearable displaying device in prior art.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

A definition that applies throughout this disclosure will now be presented.

The term "comprising" means "including, but not necessarily limited to"; it specifically indicates open-ended inclusion or membership in a so-described combination, group, series, and the like.

Figure 3:
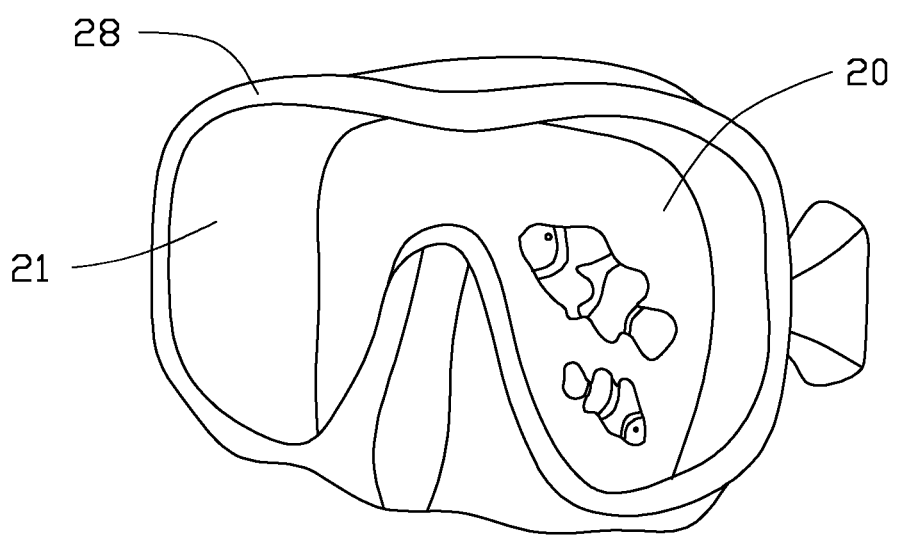
FIG. 3 is a schematic diagram of a wearable displaying device, according to an exemplary embodiment.
Figure 4:
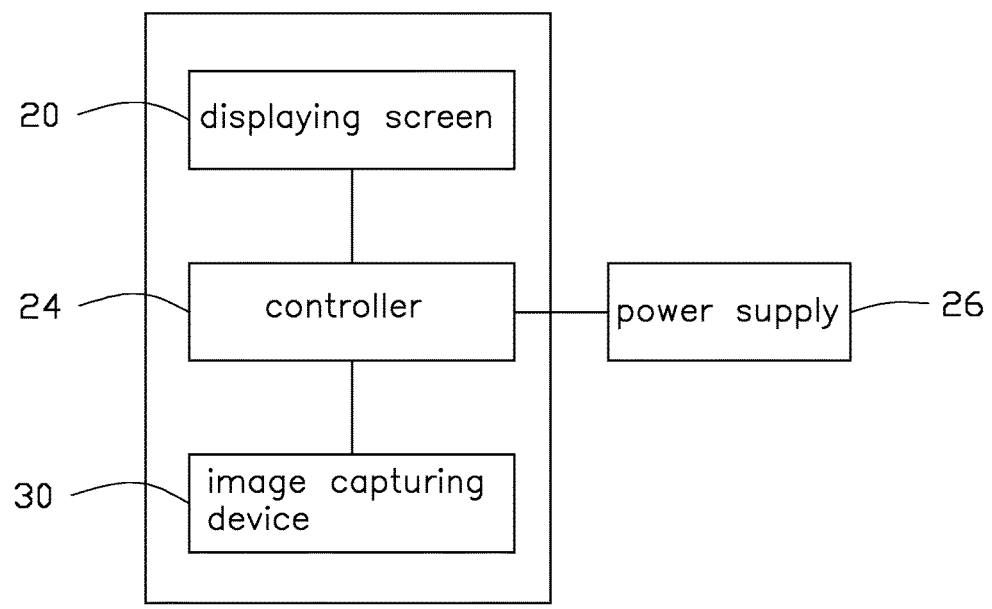
FIG. 4 is a block diagram of a wearable displaying device, according to a first exemplary embodiment.

FIG. 3 and FIG. 4 illustrate an embodiment of a wearable displaying device 100. A shape of the wearable displaying device 100 is similar to that of goggles and can be wearable on the head of a user. The wearable displaying device 100 has augmented reality function. In an embodiment, the wearable displaying device 100 is in the form of goggles having the augmented reality function. In another embodiment, the wearable displaying device 100 includes a display 20, an image capturing device 30, a controller 24, and a power supply 26. When the user wears the wearable displaying device 100, the display 20 is in front of the user's eyes. The power supply 26 provides power to the controller 24, the display 20, and the image capturing device 30. The image capturing device 30 can capture an image in front of the user. The controller 24 controls the display 20 to display the captured image on a first preset displaying area.

Figure 5:
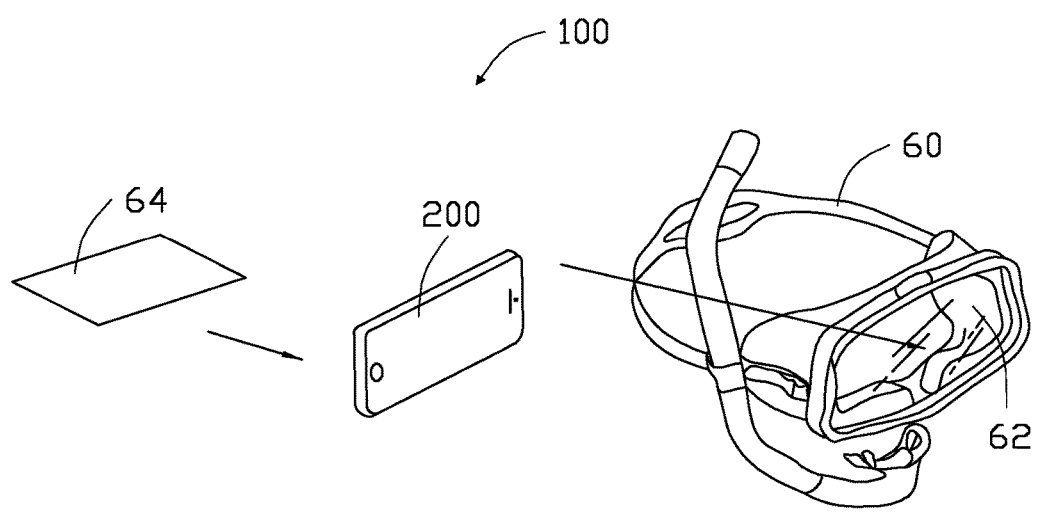
FIG. 5 is a schematic diagram of a wearable displaying device, according to another exemplary embodiment.

The wearable displaying device 100 includes a shell 28. The shell 28 defines a sealed receiving space 21. The display 20 is received in the receiving space 21 and sealed when surrounded by the shell 28. FIG. 5 illustrates, in another embodiment, the wearable displaying device 100 including a goggle 60. The goggle 60 includes a lens 62. A transparent waterproofer 64 is attached in front of the lens 62. The waterproofer 64 may be glass. The receiving space is defined between the lens 62 and the waterproofer 64. A mobile phone 200 is attached between the lens 62 and the waterproofer 64 and sandwiched between the lens 62 and the waterproofer 64. A display unit of the mobile phone 200 is then effectively the display 20. The image capturing device 30 can be a camera of the mobile phone 200.

Figure 6:
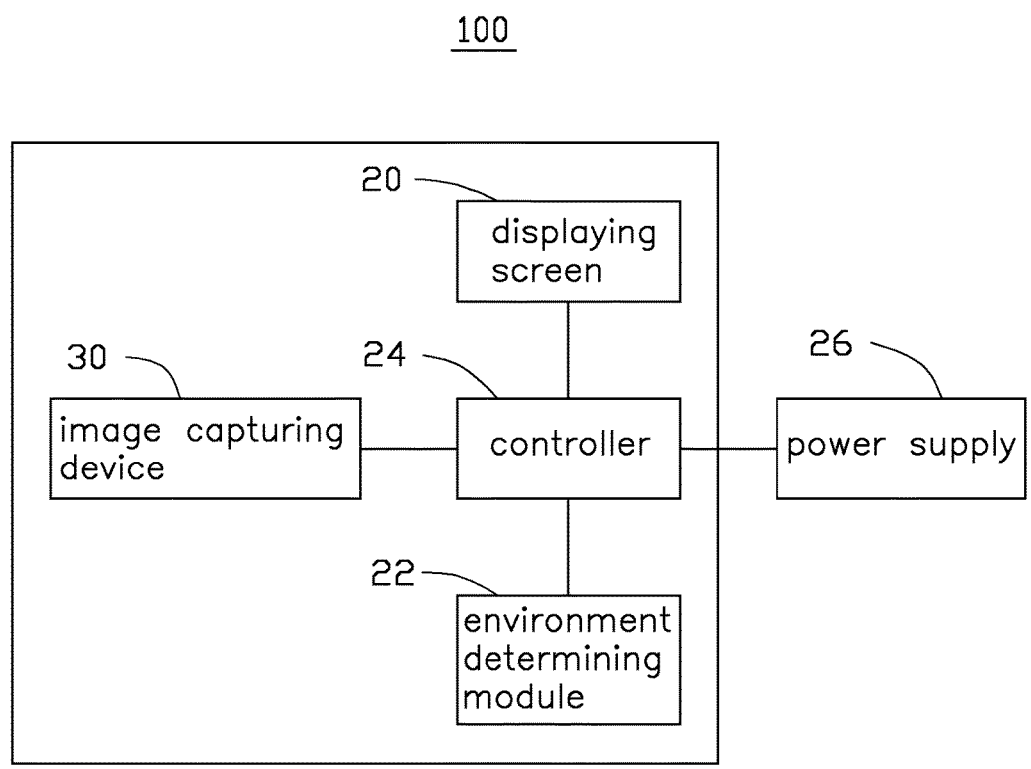
FIG. 6 is a block diagram of a wearable displaying device, according to second exemplary embodiment.

FIG. 6 illustrates, in another embodiment, the wearable displaying device 100 further including an environment determining module 22. The environment determining module 22 determines whether the wearable displaying device 100 is in a wet environment. When the augmented reality function of the wearable displaying device 100 is activated and the wearable displaying device 100 is in a wet environment, the controller 24 controls the display 20 to display an image having a life-like aquatic scene in a preset position of the captured image. Such life-like aquatic scene may be superimposed on or synthesized with a captured image.

Figure 7:
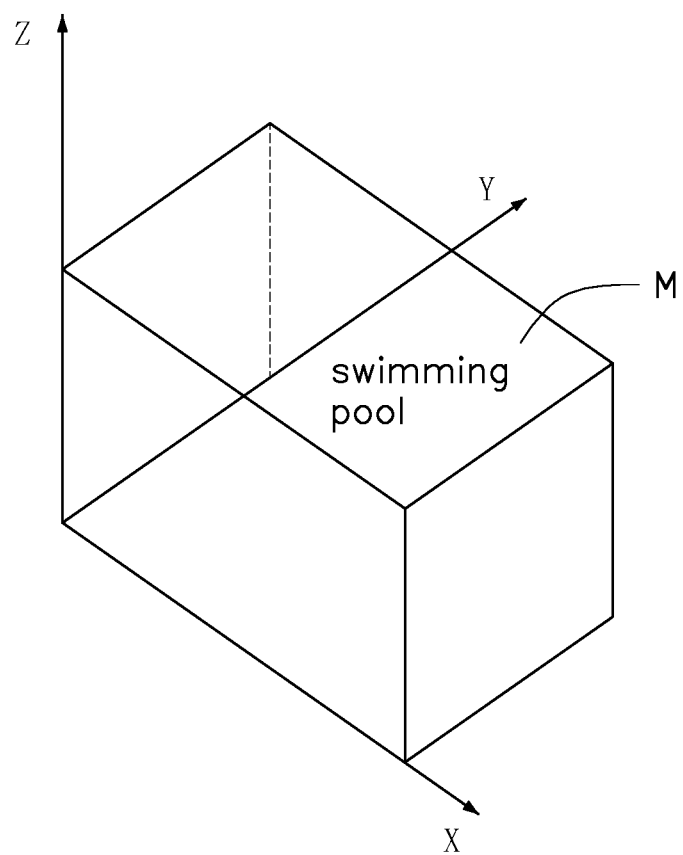
FIG. 7 is a schematic diagram of the wearable displaying device of FIG. 3 displaying a captured image.
Figure 8:
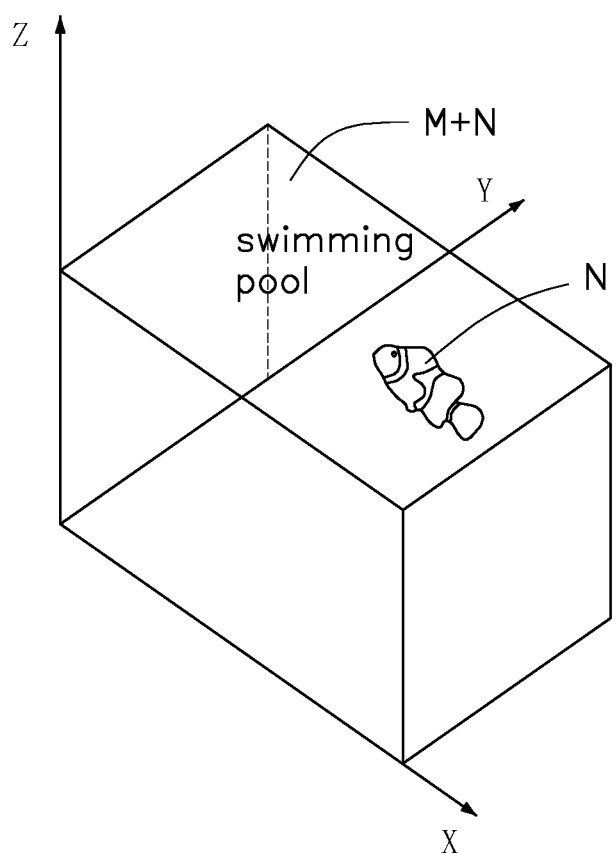
FIG. 8 is a schematic diagram of the wearable displaying device of FIG. 3 displaying an image having a life-like aquatic scene.

FIG. 7 and FIG. 8 illustrate that the image capturing device 30 captures image M, for example a swimming pool. The controller 24 controls the display 20 to display the image M on the first preset displaying area. The environment determining module 22 determines that the wearable displaying device 100 is in a wet environment. The controller 24 controls the display 20 to display the image M and the life-like aquatic scene (life-like aquatic scene N) in the preset position of the image M (obtaining the synthesized image M+N).

Figure 9:
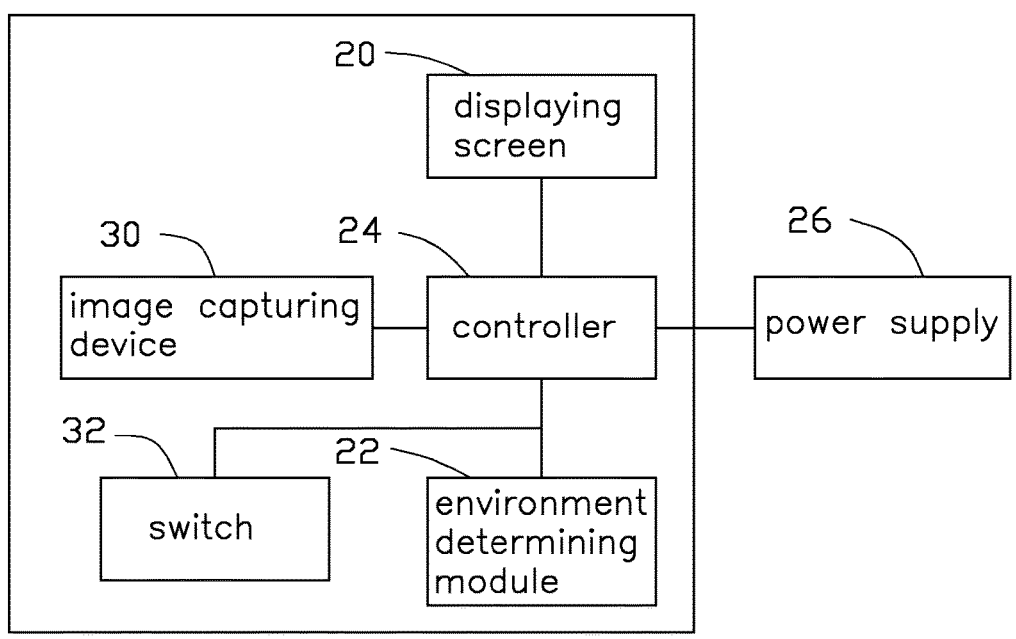
FIG. 9 is a block diagram of a wearable displaying device, according to a third exemplary embodiment.

FIG. 9 illustrates a wearable displaying device 100 further including a switch 32. In response to an operation, the switch 32 sends an augmented reality function activating signal to the controller 24. According to the augmented reality function activating signal, the controller 24 activates the augmented reality function of the wearable displaying device 100. In another embodiment, the wearable displaying device 100 does not include the switch 32. When the power supply 26 provides power to the controller 24, the augmented reality function is activated.

Figure 10:
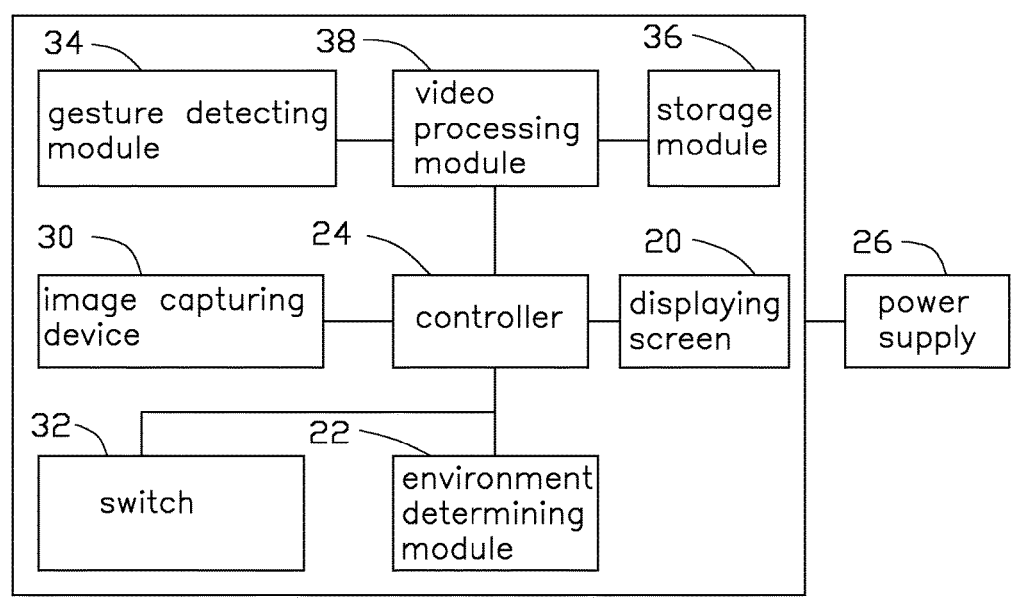
FIG. 10 is a block diagram of a wearable displaying device, according to a fourth exemplary embodiment.

FIG. 10 illustrates the wearable displaying device 100 further including a gesture detecting module 34, a storage module 36, and a video processing module 38. The gesture detecting module 34 detects a user gesture, for example, a shooting gesture or a touching gesture. The storage module 36 stores a relationship between the gesture and action of the scene N. In the embodiment, the storage module 36 is connected to the video processing module 38. In another embodiment, the storage module 36 is directly connected to the controller 24. In another embodiment, the storage module 36 is positioned in the controller 24. A detected first gesture corresponds to instructions to cause animation of the aquatic life added to scene N. A detected second gesture corresponds to instructions to cause freezing action of the aquatic life added to the scene. Other gestures may cause other effects. According to the detected gesture, the video processing module 38 controls, for example, the aquatic life added in the scene N (and in the synthesized image M+N) to do the action corresponding to the detected gesture. The gesture detecting module 34 can be an infrared sweeping device or a sonic sensor. In another embodiment, the gesture detecting module 34 analyzes whether the detected gesture includes a hand and determines the gesture of the hand.

Figure 11:
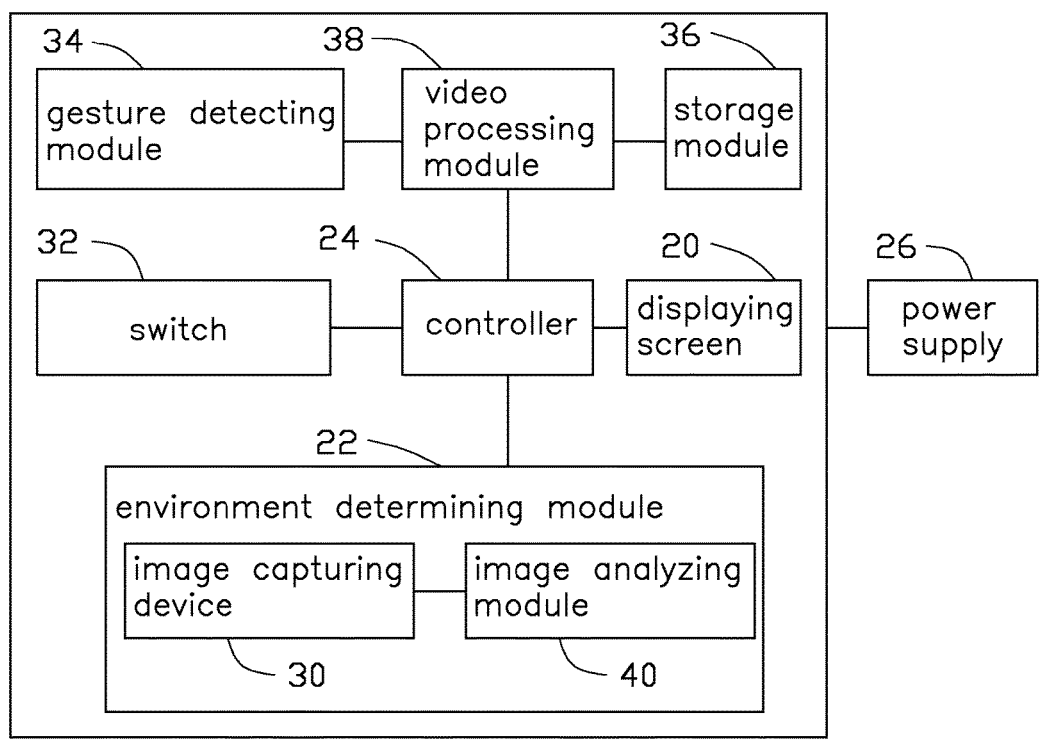
FIG. 11 is a block diagram of an environment determining module in the device of FIG. 3, according to an exemplary embodiment.

FIG. 11 illustrates, in another embodiment, the environment determining module 22 uses data achieved from the image capturing device 30 and an image analyzing module 40. The image analyzing module 40 analyzes whether the captured image was taken in a water environment. When the captured image is determined to include a water environment, the controller 24 controls the display 20 to display the virtual aquatic life video synthesized in the preset position of the captured image.

Figure 12:
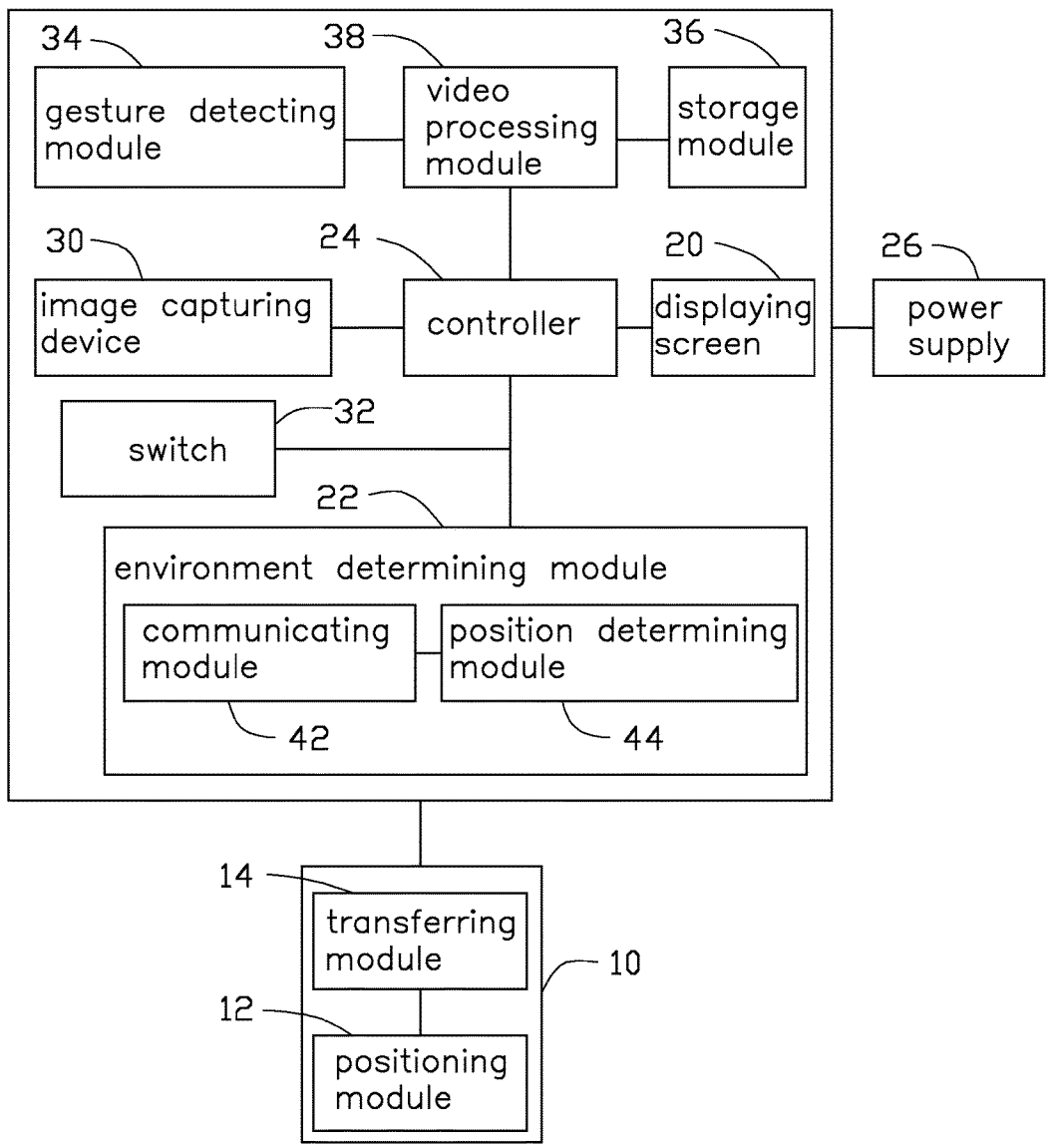
FIG. 12 is a block diagram of the environment determining module in FIG. 11, according to another exemplary embodiment.

FIG. 12 illustrates, in another embodiment, that the environment determining module 22 includes a communicating module 42 and a position determining module 44. The communicating module 42 communicates with a positioning device 10 positioned in a region having the water area. The region may have a swimming pool or sea bank. According to a position of the positioning device 10, the position determining module 44 determines that the wearable displaying device 100 is in a wet environment.

The positioning device 10 can be employed to the wearable displaying device 10 shown in FIG. 3 and FIG. 5. The positioning device 10 can communicate with a number of wearable displaying devices 10.

The positioning device 10 includes a positioning module 12 and a transferring module 14. The positioning module 12 obtains position information of the wearable displaying device 100 (or the user). The position information includes a location of the wearable displaying device 100 relative to a preset position, and an orientation of the wearable displaying device 100. The relative position includes a horizontal distance between the wearable displaying device 100 and the preset position, and a perpendicular distance between the wearable displaying device 100 and the preset position in a perpendicular direction. The transferring module 14 transfers the position information to wearable displaying device 100 in real time. The communicating module 42 receives the position information and the position of the positioning device 100. According to the position information, the scene N video and a video processing rule (hereinafter described), the video processing module 38 processes the scene N video in real time to generate a new scene N' video corresponding to the position information. The controller 24 controls the display 20 to display the new scene N' video.

In an embodiment, the aquatic life video is stored in the wearable displaying device 100. In another embodiment, the aquatic life video is stored in positioning device 10 and the transferring module 14 transfers the aquatic life video to the wearable displaying device 100.

The video processing rule includes that the greater the horizontal distance between the wearable displaying device 100 and the preset position, the smaller is the aquatic life displayed on the display 20. The greater the perpendicular distance between the wearable displaying device 100 and the preset position, the smaller is the aquatic life displayed on the display 20.

Figure 13:
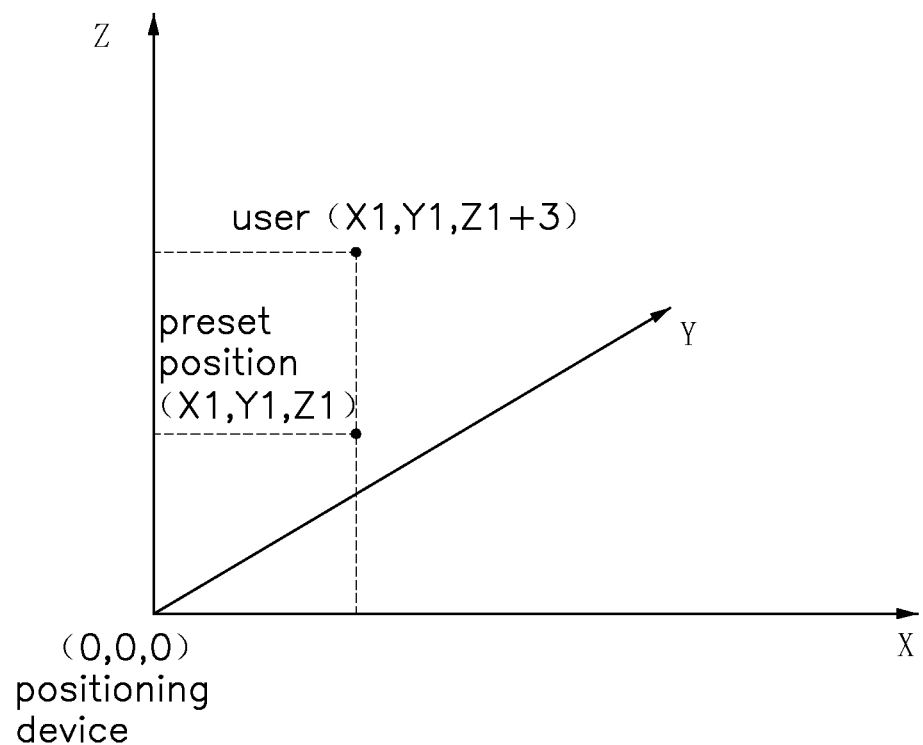
FIG. 13 is a schematic diagram of the wearable displaying device of FIG. 3 determining a position.

FIG. 13 illustrates the coordinate of the position of the positioning device 10 is (0, 0, 0). The coordinate of the preset position of the aquatic life is (X1, Y1, Z1). The coordinate of the position of the wearable displaying device 100 (the user) is (X1, Y1, Z1+3). The user is positioned above the aquatic life. When the orientation is face down, the user watches the aquatic life from the rear. When the wearable displaying device 100 is positioned under the preset position and the orientation is face upwards, the user watches the aquatic life from below. Because the position of the wearable displaying device 100 is changeable, a size and a portion of the aquatic life watched by user are also changeable. When user moves closer to the preset position, the aquatic life gradually increases in size.

The position information obtained by the positioning device 10 does not include the orientation of the wearable displaying device 100. The wearable displaying device 100 includes an orientation sensing module, for example, a gyroscope. The orientation sensing module senses the orientation of the wearable displaying device 100.

The preset position can be the position of the positioning device 10 or a position in the wet region. When the distance between the wearable displaying device 100 and a preset position gets smaller than a preset value, the controller 24 controls the display to display a jumping aquatic life.

Figure 14:
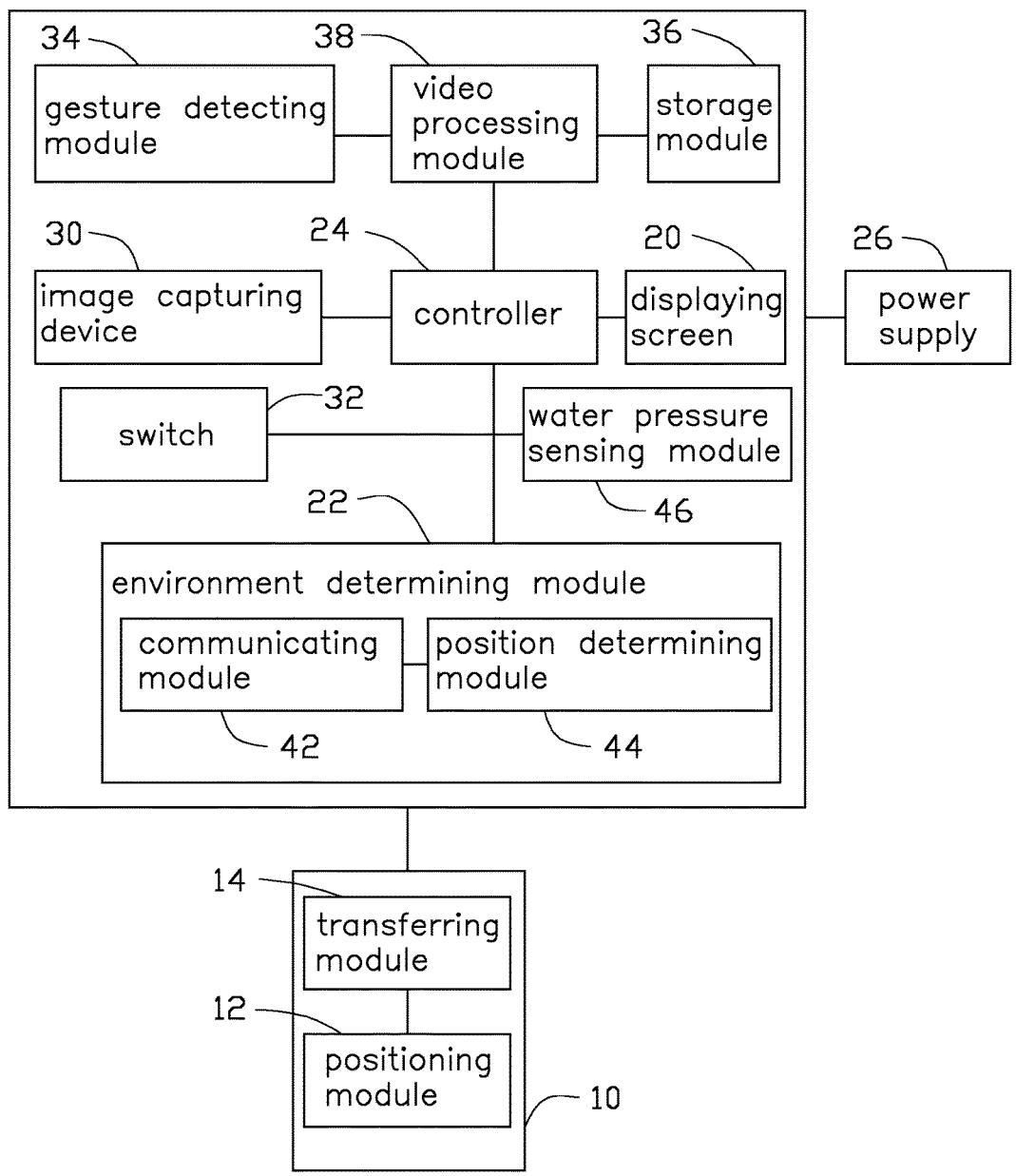
FIG. 14 is a block diagram of a wearable displaying device, according to a fifth exemplary embodiment.

FIG. 14 illustrates that the wearable displaying device 100 further includes a water pressure sensing module 46. The water pressure sensing module 46 senses a water pressure on the wearable displaying device 100. When the water pressure sensing module 46 does not sense a water pressure, it illustrates that the wearable displaying device 100 is not in water. According to sensed result of the water pressure sensing module 46 and the orientation of the wearable displaying device 100, the video processing module 38 generates the new aquatic life video. When the coordinate of the position of the positioning device is (0, 0, 0), the coordinate of the preset position of the aquatic life is (X1, Y1, Z1), and the coordinate of the position of the wearable displaying device 100 (the user) is (X1, Y1, Z1+3), the wearable displaying device 100 is face down. If the pressure sensing module 46 senses a water pressure in this situation, the user is watching the scene from the rear. When the wearable displaying device 100 is face upward and the pressure sensing module 46 does not sense a water pressure, the preset position is not in view of the user, the aquatic life is not displayed on the display 20. When the wearable displaying device 100 is face upward and the pressure sensing module 46 senses a water pressure, the preset position is not in view of the user, user watches the aquatic life from below.

When a part of the aquatic life is positioned under water and other parts of the aquatic life is positioned above water, a simulation image is display on the display 20. When the wearable displaying device 100 is in water, the simulation image includes a reflective phenomenon of light on the part of the aquatic life above water. When the wearable displaying device 100 is positioned above water, the simulation image includes a reflective phenomenon of light on the part of the aquatic life in water.

Figure 15:
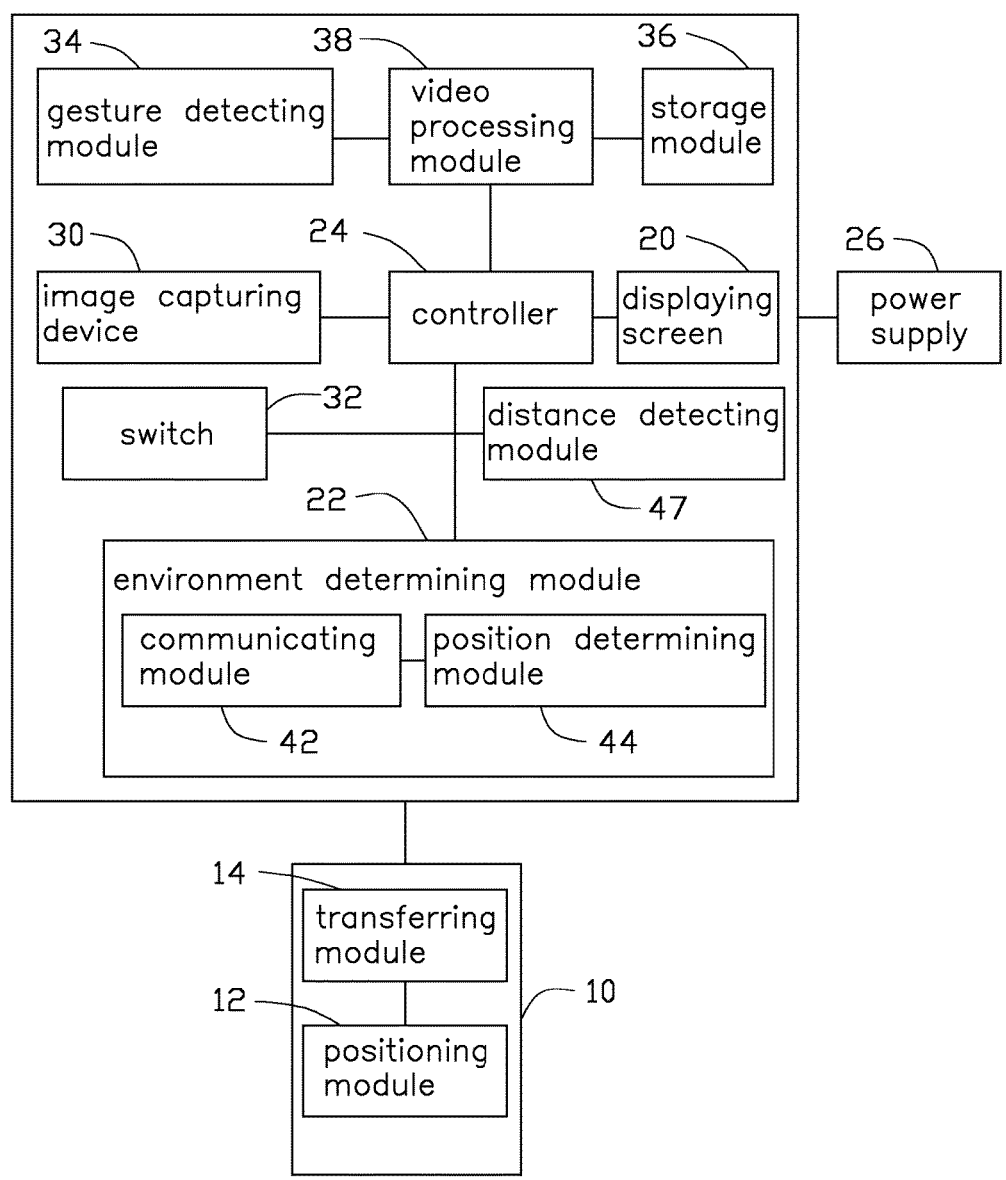
FIG. 15 is a block diagram of a wearable displaying device, according to a sixth exemplary embodiment.

FIG. 15 illustrates, in another embodiment, that the wearable displaying device 100 includes a distance detecting module 47. The distance detecting module 47 detects a distance between the wearable displaying device 100 and water surface. The distance detecting module 47 can be an optical radar. In another embodiment, the distance between the wearable displaying device 100 and water surface can be determined by a perpendicular position of the positioning device 10 and the perpendicular position of the wearable displaying device 100. For example, a perpendicular distance between the positioning device 10 and the water surface is 0.5 meter. The wearable displaying device 100 is positioned under the positioning device 0.3 meter. The wearable displaying device 100 is positioned above the water 0.2 meter.

In another embodiment, the positioning device 10 communicates with a number of wearable displaying devices 100. The positioning device 10 wirelessly communicates with the wearable displaying device 100. In an embodiment, each wearable displaying device 100 includes a GPS function. The wearable displaying device 100 transfers the position of the wearable displaying device 100 acquired through the GPS function to the positioning device 10. In another embodiment, the positioning device 10 sends sonic wave or light ray to detect the position of the wearable displaying device 100 and stores the position in the positioning device 10.

In another embodiment, the positioning device 10 transfers the location of one or more wearable displaying devices 10 to other wearable displaying devices 10. When a relative location between different wearable displaying devices 10 changes, the image displayed on the display is changed. For example, when a first user wears a first wearable displaying device 100 faces toward a second user wearing a second wearable displaying device 100, an aquatic life may be positioned above the head of second user. When the distance between two wearable displaying devices 100 is shorter, a size of the aquatic life correspondingly zooms in. As the distance between two wearable displaying devices 100 decreases, a size of the aquatic life may zoom out.

Figure 16:
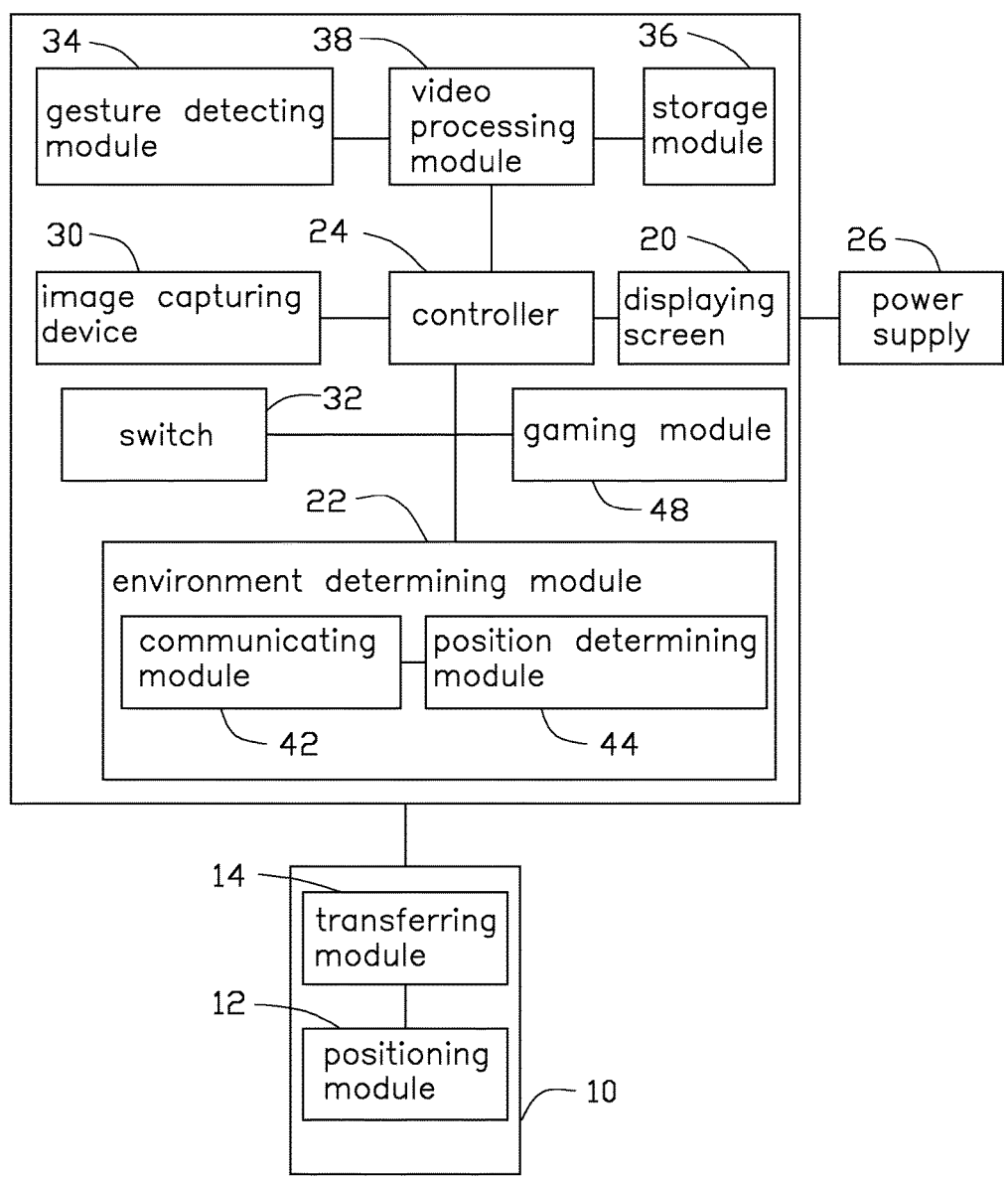
FIG. 16 is a block diagram of a wearable displaying device, according to a seventh exemplary embodiment.

FIG. 16 illustrates that the wearable displaying device 100 further includes a gaming module 48. According to an activating game operation, the gaming module 48 displays a gaming user interface on a second preset displaying area of the display 20. The gaming user interface includes a team-mate displaying area. The team-mate displaying area displays the position information of the all of the wearable displaying devices 100 in the immediate area. According to the position information, the user operates a team-mate displaying function on the team-mate displaying area to form a game team. The team-mate displaying function may include selecting, determining, and deselecting a teammate. In an embodiment, according to the user gesture, the wearable displaying device 100 corresponds to the selected position as being selected as a teammate.

The game interface further includes an invitation interface. When a first user selects the second wearable displaying device 100, the second wearable displaying device 100 displays the invitation interface including first user information. According to the first user information, the second user determines whether to accept invitation of the first user.

The gaming module 48 transfers information of the game team to a game server. The information of the game team includes the position of invited wearable displaying device 100. The game server transfers team user information to each wearable displaying device 100 of the game team. The wearable displaying device 100 displays information as to all team members on the display 20.

When the game team is determined, the wearable displaying device 100 displays a water gaming interface. The water gaming interface includes the aquatic life video and icons associated with various activities such as an attacking icon, a guarding icon, and the team user information.

The aquatic life shown to members of the same team will have uniform markings different from the uniform markings of aquatic life of a different team. Thus, according to the markings, the user can identify whether a person nearby is on their own team.

When the user operates the attacking icon/guarding icon, the controller 24 controls the selected aquatic life to move in a preset rule. For example, the selected aquatic life moves to the user of the other team or attacks other displayed aquatic lives or guards one of their own team-mates.

When using the wearable displaying device 100, the air pressure in the wearable displaying device 100 is made less than the air pressure outside of the wearable displaying device 100, to prevent water entering the wearable displaying device 100. In an embodiment, the wearable displaying device 100 is worn on the head of the user, and his eyes face the display 20. The wearable displaying device 100 is pressed to eject air between the face of the user and the wearable displaying device 100 to form a gap between the wearable displaying device 100 and the face of the user. The air pressure in the wearable displaying device 100 is decreased to make the air pressure in the wearable displaying device 100 less than the air pressure outside of the wearable displaying device 100.

In another embodiment, the wearable displaying device 100 includes a pressure release valve. When the wearable displaying device 100 is worn on the head of the user and the user's eyes face the display 20, the pressure release valve is activated to eject air between the face of the user and the wearable displaying device 100. When the air pressure in the wearable displaying device 100 is decreased, the pressure release valve is turned off to make the air pressure in the wearable displaying device 100 less than the air pressure outside of the wearable displaying device 100.

Figure 17:
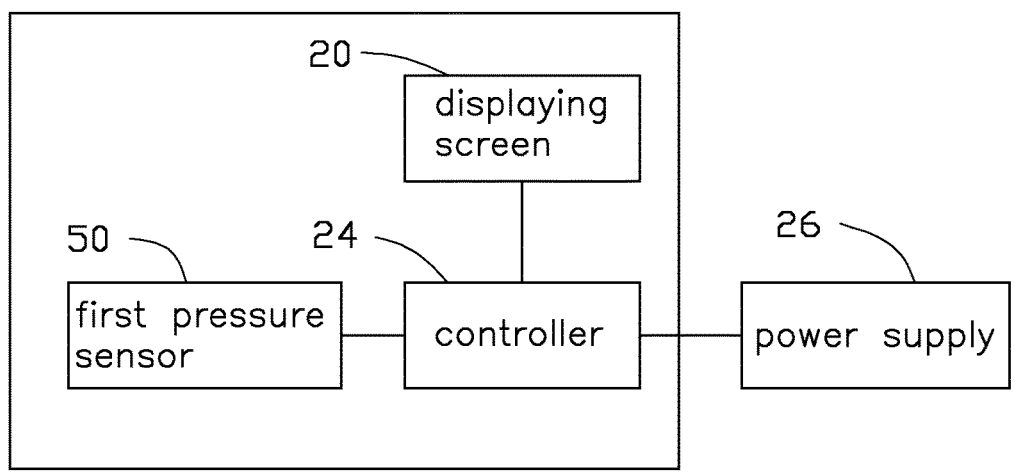
FIG. 17 is a block diagram of the wearable displaying device of FIG. 3 while determining whether power should be provided to the wearable displaying device, according to a first exemplary embodiment.

FIG. 17 illustrates, in an embodiment, that the wearable displaying device 100 includes a first pressure sensor 50. The first pressure sensor 50 senses the air pressure in the wearable displaying device 100. The first pressure sensor 50 connects to the controller 24. The first pressure sensor 50 can be a resistance pressure sensor or an inductance pressure sensor. In an embodiment, the first pressure sensor 50 is positioned in the wearable displaying device 100. When the air pressure in the wearable displaying device 100 is less than a preset air pressure of, for example, one barometric pressure, the wearable displaying device 100 can determine that the air pressure in the wearable displaying device 100 is less than the air pressure outside of the wearable displaying device 100.

Figure 18:
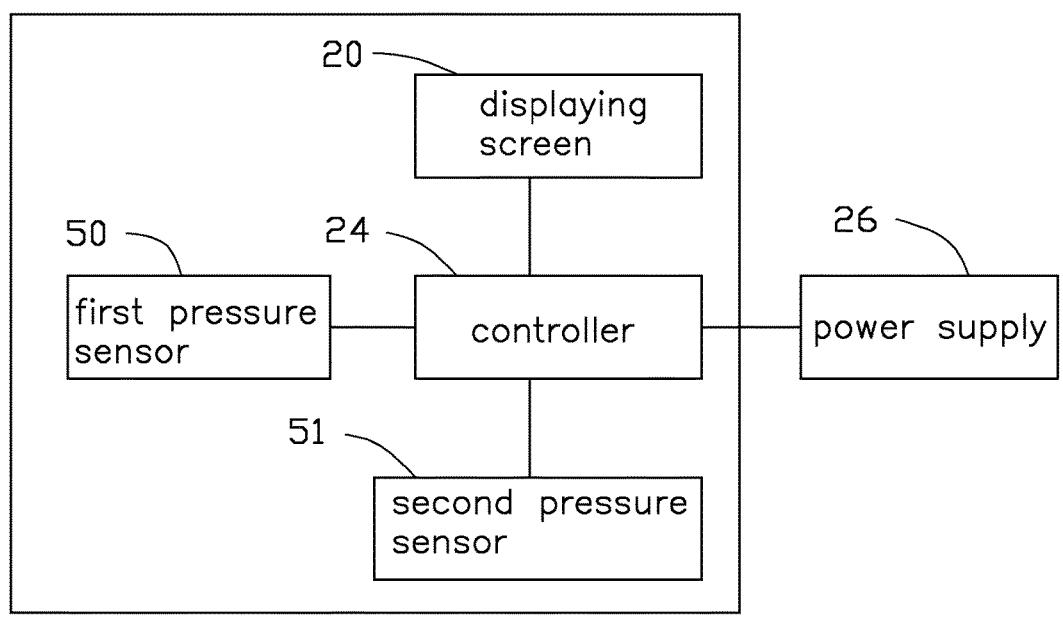
FIG. 18 is a block diagram of the wearable displaying device of FIG. 17 while determining whether power should be provided to the wearable displaying device, according to a second exemplary embodiment.

FIG. 18 illustrates, in another embodiment, that the wearable displaying device 100 includes a second pressure sensor 51. The second pressure detecting module 50 senses the air pressure outside of the wearable displaying device 100. The wearable displaying device 100 compares the air pressure in the wearable displaying device 100 to the air pressure outside of the wearable displaying device 100 to determine whether there is an air pressure difference.

When the wearable displaying device 100 includes the first pressure sensor 50 and the air pressure in the wearable displaying device 100 is the preset air pressure (for example, one barometric pressure), it illustrates that there is a gap between the wearable displaying device 100 and the face of the user. The controller 24 controls the power supply 26 to power off or reduce a voltage of the wearable displaying device 100. When the air pressure in the wearable displaying device 100 is less than the preset air pressure, the controller 24 controls the power supply 26 to power on or give a normal voltage to the wearable displaying device 100.

When the wearable displaying device 100 includes the first pressure sensor 50 and the second pressure sensor 51, and the air pressure in the wearable displaying device 100 is equal to the air pressure outside of the wearable displaying device 100, the controller 24 controls the power supply 26 to power off or reduce a voltage of the wearable displaying device 100.

Figure 19:
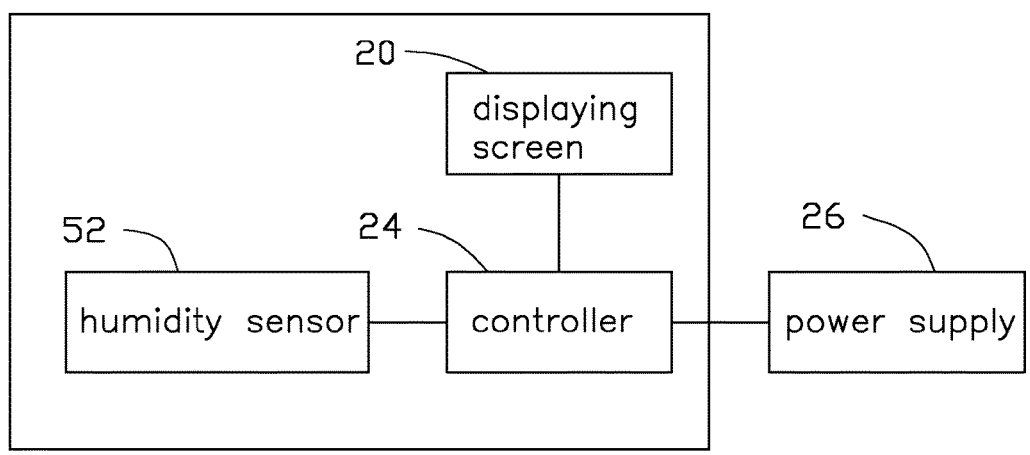
FIG. 19 is a block diagram of the wearable displaying device of FIG. 17 while determining whether power should be provided to the wearable displaying device, according to a third exemplary embodiment.

FIG. 19 illustrates, in another embodiment, that the wearable displaying device 100 includes a humidity sensor 52. The humidity sensor 52 senses humidity in the wearable displaying device 100. When the humidity is greater than a preset value, the controller 24 controls the power supply 26 to power off. When the humidity is greater than a preset value, or becomes greater because of water entering, the power supply 26 does not provide power to the wearable displaying device 100.

Figure 20:
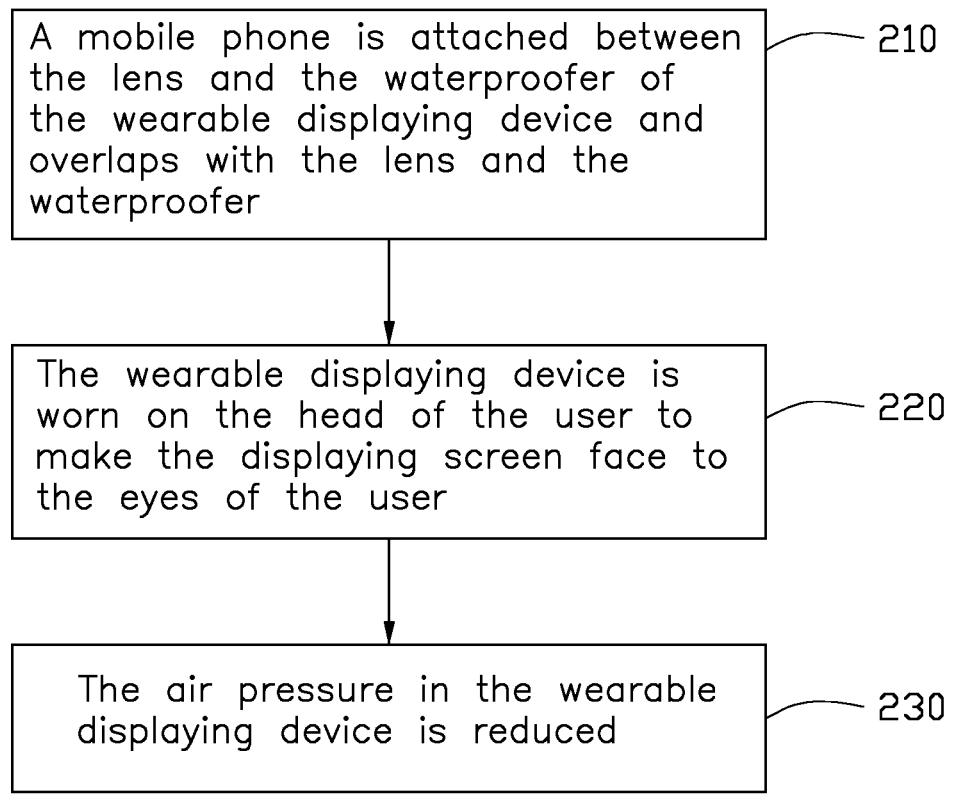
FIG. 20 is a flowchart of a method for using the wearable displaying device of the disclosure.

FIG. 20 illustrates a flowchart of using the wearable displaying device 100.

At block 210, a mobile phone is attached between the lens 62 and the waterproofer 64 of the wearable displaying device 100 and sandwiched with the lens 62 and the waterproofer 64.

At block 220, the wearable displaying device 100 is worn on the head of the user to make the display 20 face to the user's eyes.

At block 230, the wearable displaying device 100 is pressed to expel the air in the wearable displaying device 100 to reduce the air pressure in the wearable displaying device 100.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wearable displaying device comprising:
a goggle comprising a lens;
a waterproofer attached before the lens, a sealed receiving space being defined between the lens and the waterproofer;
a display received in the receiving space; and
an image capturing device received in the receiving space;
wherein the wearable displaying device is wearable on the head of a user and has augmented reality function; when the wearable displaying device is wearable on the head of the user, the display sandwiched between the lens and the waterproofer, the wearable displaying device further comprises a controller, the image capturing device captures an image before the user, the display comprises a first preset displaying area, the wearable displaying device further comprises an environment determining module, the environment determining module determines whether the wearable displaying device is in an environment having water, when the augmented reality function of the wearable displaying device is activated and the wearable displaying device is in an environment having water, the controller controls the display to display an image having a life-like aquatic scene in a preset position of the image captured by the image capturing device on the first preset displaying area.

2. The wearable displaying device as claimed in claim 1, wherein the wearable displaying device further comprises a switch, in response to an operation, the switch sends an augmented reality function activating signal to the controller, according to the augmented reality function activating signal, the controller activates the augmented reality function of the wearable displaying device.

3. The wearable displaying device as claimed in claim 1, wherein the environment determining module comprises an image analyzing module, the image analyzing module analyzes whether the captured image includes a water area, when the captured image includes a water area, the controller controls the display to display the life-like aquatic scene in the preset position of the captured image.

4. The wearable displaying device as claimed in claim 1, wherein the wearable displaying device further comprises a gesture detecting module, a storage module and a video processing module, the gesture detecting module detects a user gesture, the storage module stores a relationship between the gesture and action of the aquatic life, according to the detected gesture, the video processing module controls the aquatic life in the image to do the action corresponding to the detected gesture.

5. The wearable displaying device as claimed in claim 1, wherein the environment determining module comprises a communicating module and a position determining module, the communicating module communicates with a positioning device in a region having water area, according to a position of the positioning device, the position determining module determines the wearable displaying device in the environment having water.

6. The wearable displaying device as claimed in claim 5, wherein positioning device comprises a positioning module and a transferring module, the positioning module obtains position information of the wearable displaying device, the position information comprises a relative position between the wearable displaying device and a preset position, and an orientation of the wearable displaying device, the transferring module transfers the position information to corresponding wearable displaying device in real time, the communicating module receives the position information and the position of the positioning device, according to the position information, the aquatic life video and a video processing rule, the video processing module processes the aquatic life video in real time to generate a new aquatic life video corresponding to the position information, the controller controls the display to display the new aquatic life video.

7. The wearable displaying device as claimed in claim 6, wherein the relative position comprises a horizontal distance between the wearable displaying device and the preset position, the video processing rule comprises that the horizontal distance between the wearable displaying device and the preset position is longer, the aquatic life displayed on the display is smaller.

8. The wearable displaying device as claimed in claim 6, wherein when the orientation is face down, the display displays a backside of the aquatic life facing the user, and when the orientation is face upwards, the display displays a tummy of the aquatic life facing the user.

9. The wearable displaying device as claimed in claim 1, further comprising:
 a first pressure sensor connected to the controller and configured to sense the air pressure in the wearable displaying device; and
 a power supply providing power to the wearable displaying device;
 wherein the first pressure sensor senses the air pressure in the wearable displaying device and if the air pressure is equal a preset air pressure, the controller controls the power supply to power off.

10. The wearable displaying device as claimed in claim 1, further comprising a gaming module and upon activation of the game, the gaming module displays a gaming user interface on a second preset displaying area of the display.

11. A wearable displaying device comprising:
 an image capturing device;
 a goggle comprising a lens; and
 a waterproofer attached before the lens, a sealed receiving space being defined between the lens and the waterproofer, the receiving space configured to receive the image capturing device and a mobile phone;
 wherein the wearable displaying device is wearable and has augmented reality function, a display of the mobile phone overlapped with the lens and the waterproofer, the wearable displaying device further comprises a controller, the image capturing device captures an image before the user, the display comprises a first preset displaying area, the controller controls the display to display captured image on the first preset displaying area, the wearable displaying device further comprises an environment determining module, the environment determining module determines whether the wearable displaying device is in an environment having water, when the augmented reality function of the wearable displaying device is activated and the wearable displaying device is in an environment having water, the controller controls the display to displays an image having a life-like aquatic scene in a preset position of the image captured by the image capturing device on the first preset displaying area.

12. The wearable displaying device as claimed in claim 11, wherein the wearable displaying device further comprises a switch, in response to an operation, the switch sends an augmented reality function activating signal to the controller, according to the augmented reality function activating signal, the controller activates the augmented reality function of the wearable displaying device.

13. The wearable displaying device as claimed in claim 11, wherein the environment determining module comprises an image analyzing module, the image analyzing module analyzes whether the captured image includes a water area, when the captured image includes a water area, the controller controls the display to display the image having the life-like aquatic scene in the preset position of the captured image.

14. The wearable displaying device as claimed in claim 11, wherein the wearable displaying device further comprises a gesture detecting module, a storage module and a video processing module, the gesture detecting module detects a user gesture, the storage module stores a relationship between the gesture and action of the aquatic life, according to the detected gesture, the video processing module controls the aquatic life in the image to do the action corresponding to the detected gesture.

15. The wearable displaying device as claimed in claim 11, wherein the environment determining module comprises a communicating module and a position determining module, the communicating module communicates with a positioning device in a region having water area, according to a position of the positioning device, the position determining module determines the wearable displaying device in the environment having water.

16. The wearable displaying device as claimed in claim 15, wherein positioning device comprises a positioning module and a transferring module, the positioning module obtains position information of the wearable displaying device, the position information comprises a relative position between the wearable displaying device and a preset position, and an orientation of the wearable displaying device, the transferring module transfers the position information to corresponding wearable displaying device in real time, the communicating module receives the position information and the position of the positioning device, according to the position information, the aquatic life video and a video processing rule, the video processing module processes the aquatic life video in real time to generate a new aquatic life video corresponding to the position information, the controller controls the display to display the new aquatic life video.

17. The wearable displaying device as claimed in claim 16, wherein the relative position comprises a horizontal distance between the wearable displaying device and the preset position, the video processing rule comprises that the horizontal distance between the wearable displaying device and the preset position is longer, the aquatic life displayed on the display is smaller.

18. The wearable displaying device as claimed in claim 16, wherein when the orientation is face down, the display displays a backside of the aquatic life facing the user, and when the orientation is face upwards, the display displays a tummy of the aquatic life facing the user.

19. The wearable displaying device as claimed in claim 11, further comprising:
   a humidity sensor connected to the controller and configured to sense humidity in the wearable displaying device; and
   a power supply providing power to the wearable displaying device;
   wherein the humidity sensor senses the humidity in the wearable displaying device and if the humidity is equal to or greater than a preset value, the controller controls the power supply to power off.

20. The wearable displaying device as claimed in claim 11, further comprising a gaming module, and upon activation of the game, the gaming module displays a gaming user interface on a second preset displaying area of the display.

* * * * *